Sept. 28, 1943. G. W. YOUNGER 2,330,535
DEVICE FOR DETERMINING LENGTH OF WALKING STICK TO SUIT PURCHASER
Filed April 24, 1941
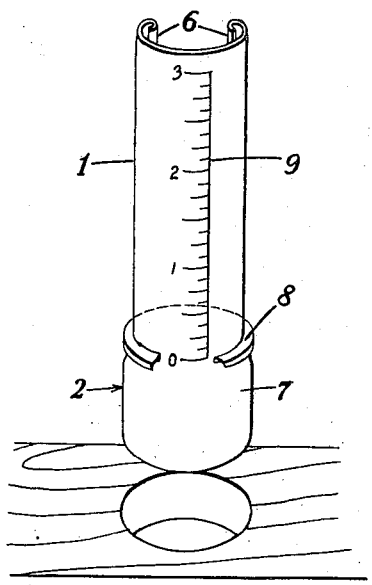
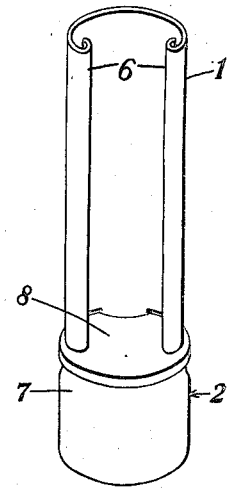
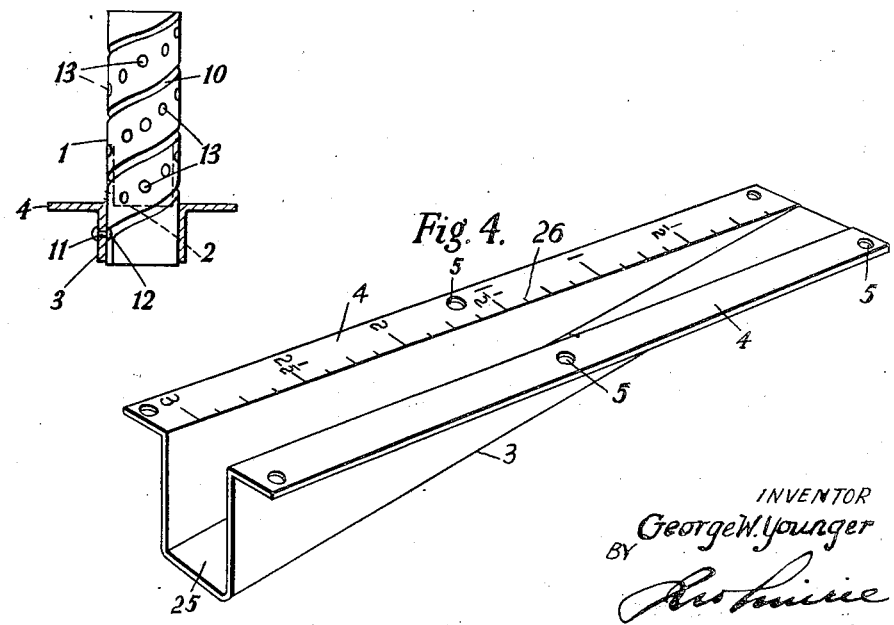
INVENTOR
George W. Younger
BY
ATTORNEY Patented Sept. 28, 1943

2,330,535

UNITED STATES PATENT OFFICE 2,330,535

DEVICE FOR DETERMINING LENGTH OF WALKING STICKS TO SUIT PURCHASERS

George Waterworth Younger, Dorking, England

Application April 24, 1941, Serial No. 390,178

3 Claims. (Cl. 33—169)

This invention relates to a device, more particularly for use in umbrella shops and stores, for determining the correct length of walking and umbrella sticks to suit the requirements of the individual purchaser so that people of varying stature, or length of arm, can ensure that the sticks or umbrellas they are purchasing are of the correct length to suit their individual requirements.

At the present time the customer when purchasing a walking stick or umbrella has to depend, very largely, upon the judgment of the seller, where shortening in length is concerned, and the object of the present invention is to provide a means whereby the customer shall be in a position to indicate to the seller the precise amount of shortening he desires. Guesswork is thus entirely eliminated.

According to this invention the device enables walking or umbrella sticks (hereinafter called sticks) to be easily and accurately marked for shortening purposes so that any person purchasing a stick and having use of the device can be sure of getting a stick of the desired length.

The device according to the invention comprises a socket adapted to receive the bottom of the stick to a variable extent to bring the stick handle to the requisite height above floor level and a scale which is co-ordinated with the top of the socket member whereby the scale indicates the extent to which the bottom end of the stick lies in the socket member.

The socket member may comprise a hole in the floor or in a platform; may comprise a socket-like fitting adapted to be introduced into such a hole; may comprise a trough having its bottom in the form of an inclined plane or may be of any other suitable form.

In the accompanying drawing:

Fig. 1 is a perspective view of a device having a sleeve member comprising a clip;

Fig. 2 is a perspective view of the said device seen from the side opposite to that shown in Fig. 1;

Fig. 3 is a side elevation, partly in section, of a form of the device comprising a sleeve adapted to screw into a floor socket;

Fig. 4 is a perspective view of a device comprising a socket member of trough-like form.

In Figs. 1 to 3 the socket member on the element adapted to receive the bottom end of the stick is indicated by 1 and the stop by 2. In Fig. 4 a base member is indicated by 3, the base member being flanged at 4.

In Figs. 1 and 2 the socket member comprises a clip, the longitudinal edges being rounded at 6 as shown; and the stop 2 is integral with the bottom of the clip. The device is made from a single blank which is slotted to enable the clip and the stop to be separately fashioned by bending the blank to provide the clip with the curved wings and rounded longitudinal edges and to provide the substantially cylindrical stop comprising the part 7 of slightly larger diameter than the clip and the cap 8 which is shrunk or pressed onto the clip. The clip has a scale 9 on its outer surface and the zero or datum line of the scale is in the plane of the top of the cap 8.

The device is applied to the stick by pressing it sidewardly onto the end thereof, the bottom of the stick butting against the top of the cap, said top being the operative surface of the stop. The device on the stick is then inserted into a hole in the floor until the handle of the stick is at the required height, whereupon the salesman sees what point of the scale coincides with the floor plane and, after removing the device from the stick, removes a length of stick corresponding to the scale reading. The cylindrical stop 2 provides a guide which facilitates insertion of the device into the hole and for this reason it is of larger diameter than the clip portion so as to stand proud of the wings of the clip.

Instead of employing a hole in the floor a platform a few inches high may be used on which a purchaser may stand and in which the necessary hole is made.

The sleeve 1, Fig. 3, is in the form of a tube which has a steep, external screw thread 10 and the socket 3 has a rivet 11 on which is a head 12 adapted to engage the thread. The tube also has a helix of perforations 13.

The device is used by applying the tube 1 to the ferrule end of the stick to be shortened, the stick being held firmly therein with its end butting against the stop 2. The tube is then introduced into the base member 3 and the base member rotated by hand by means of its flange until the top of the stick is at the requisite height. Thereupon, an awl or the like is pushed into whichever of the holes 8 is in the floor plane, the base member being so applied to the floor that its upper surface coincides with the said plane. The stick is thus marked by the awl at the required position of cutting or at a point occupying a known position with respect to the cutting position having regard to the effective length of a ferrule intended for application to the stick. The thread 5 ends near the top of the tube to prevent the latter passing completely through the socket by the stick.

In Fig. 4 the socket member 3 comprises a trough-like body the bottom 25 of which is in the form of an inclined plane. One of the flanges 4 comprises a scale 26 referring to the depth of the trough at the perpendiculars dropped from the scale markings. The device is used by inserting the bottom end of the stick into the trough and sliding it therealong whilst in contact with the bottom 25 until the handle is at the required height. The salesman can then see how much stub to remove by reference to the position of the stick with respect to the scale 26.

What I claim is:

1. A device to determine the correct length to which a selected walking stick, umbrella stick or the like is to be adjusted for the use of a particular individual, comprising a base to provide a ground-end contact for a stick of proper length, and a socket member cooperating with the base to receive the ground end of a selected stick, said socket member comprising a trough-like member having a bottom below the said base and inclined from one end to the other.

2. A construction as defined in claim 1, wherein scale markings are provided on the socket member to selectively indicate the distance of each scale-marked portion of said bottom below the said base.

3. A construction as defined in claim 1, wherein edge flanges are provided at the upper edges of the trough-like socket member to overlie and rest on said base, and wherein scale markings are arranged on at least one of said flanges to indicate the relative distances of selected parts of the bottom of the socket member below the base.

GEORGE W. YOUNGER.